Fig. 3

Patented Oct. 20, 1953

2,655,852

UNITED STATES PATENT OFFICE 2,655,852

TRACTOR-MOUNTED TWO-WAY PLOW

Ernest V. Bunting, Dearborn, Mich., assignor to Harry Ferguson, Inc., Dearborn, Mich., a corporation of Delaware Application June 23, 1945, Serial No. 601,141

27 Claims. (Cl. 97—29)

1

The present invention pertains to attachments for tractors. In its broader aspects the invention finds utility in tractor implements generally, and in mechanisms for attaching such implements to the draft linkage of a tractor. In its more limited aspects, the invention finds particular utility in two-way plows and consequently that style of implement has been selected for illustration.

The general aim of the present invention is to exploit more fully, that is to say more fully than has heretofore been possible with previously available implements, the implement control potentialities of tractor-borne, power-operated draft linkages.

Illustrative of the type of tractor in question are those equipped with the Ferguson system disclosed in patent to Henry George Ferguson, No. 2,118,180, issued May 24, 1938. This system includes, among other things, a pair of laterally spaced draft links adapted to bear an implement. Upward swing of the links by a hydraulic ram on the tractor raises the implement to transport position, while release of fluid pressure permits the implement to descend by gravity to working position. Of the automatic controls to retain uniform draft load, such as are disclosed in said patent, little further note need be taken here for the moment, since it is the long stroke raising and lowering of the links which I aim to put to other uses, coincidentally with shift of the implement between working and transport positions.

Generally stated, one object of my present invention is to effect successive steps of adjustment for a shiftable implement element as an incident to both the bodily lifting and lowering of the implement between transport and working positions.

In a more limited aspect, it is an object to provide a two-way plow attachment for tractors in which provision is made for automatically alternating the positions of separately elevatable right and left-hand plow units by shifting them to approximately a halfway point in their path of changeover movement in response to lifting of the implement as a whole into transport position, and completing the changeover as an incident to lowering the implement as a whole back into working position.

By thus distributing the changeover movement throughout a two-step cycle, as distinguished from accomplishing the complete changeover as an incident simply to the lifting of the entire implement, the mechanical shock at the beginning and end of each operation is minimized. More-

2 over, both plow units are elevated above their working position, with reference to the implement frame, when the latter is raised for transport, thereby affording maximum clearance.

In a somewhat different, although broad, aspect, it is also an object of the invention to derive a positive actuating force for positionally adjusting an implement element or elements as an incident to the gravitational lowering of the implement. As heretofore noted, in an installation of the character in question the lowering of the implement is accomplished by gravity, the action thus being more or less permissive in character. Such lowering is, however, used herein to effect application of a positive actuating force to certain of the implement elements. Thus in the instant embodiment one of the plow units of the two-way plow shown is actually raised, that is, shoved upward with reference to the implement frame, as the latter is lowered by gravity, and in consequence of such lowering.

The invention also resides in various novel combinations and correlations of the implement elements, and in structural improvements therein, which will become apparent as the following description proceeds, taken in connection with the accompanying drawings in which.

Referring more particularly to the drawings, it will be perceived (see Fig. 1) that the invention has been illustrated as embodied in a two-way plow adapted for attachment to what is a more or less standard form of tractor. Although the invention resides, in certain of its aspects, in a two-way plow, as such, the invention is applicable in its broader aspects to implements generally. Consequently there is no intention to limit the invention to the particular embodiment shown but, on the contrary, the invention is to cover all modifications, alternative uses and constructions falling within the spirit and scope of the invention as expressed in the appended claims.

Tractor and its appurtenances

The particular tractor here illustrated has the equipment typically used in the well-known "Ferguson system." Characteristically of such an installation, the tractor has trailingly pivoted on its rear end portion a pair of laterally spaced draft or hitch links 20. These links are suspended by linkage 21 from power-operated cranks 22 to swing vertically in unison. Detail of the hydraulic ram type actuator (not here shown) and its associated control valve, etc., for raising the cranks 22 will be found in Henry George Ferguson Patent No. 2,118,180, issued May 24, 1938. For present purposes, suffice it to say that admission of pressure fluid to the ram raises the cranks, while relief of pressure permits them and the attached links 20 to descend by gravity.

Provision is normally made in the "Ferguson system" for both manual and automatic control of the admission and exhaust of pressure fluid to the ram. For manual control purposes a hand lever 23 adjacent the operator's seat 24 is shifted to actuate a hydraulic control valve (not shown) to raise and lower the links between working and transport positions shown, respectively, in Figs. 3 and 2. For automatic control purposes a control rod 25 is arranged to actuate that same hydraulic control valve, all as detailed in said Ferguson patent. Inward movement of the control rod is imparted by thrust applied to an angle lever or shackle 26 and resisted by a control spring 27. Such thrust is applied from the implement so that the hitch will be raised or lowered in obedience to variations in draft load exerted by the implement. Under an excess draft load the control rod 25 is thrust still farther forward, shifting the valve mechanism to a position to completely discharge the liquid in the hydraulic ram. As a result the load of the implement is released from the rear wheels of the tractor, allowing them to spin harmlessly. This arrangement is disclosed in Henry George Ferguson Patent No. 2,118,181, issued May 24, 1938.

Normally in the "Ferguson system," thrust is applied to the angle lever 26 by a third or upper hitch link. In the present instance such a link, designated generally as 28, is included in the implement illustrated and serves to apply force to the angle lever 26 in performing the functions outlined above. In the present instance, however, the upper link 28 is of novel construction hereinafter detailed and serves to perform certain additional functions, as will later appear.

General structural layout of two-way plow

The two-way plow illustrated includes two plowing units each having a heavy plow beam 29 supporting a plow base 30 mounted thereon and a furrow wheel or running land side 31. Each plow beam may also carry a coulter 32 and a jointer 33. The plowing units which are right and left-hand units are supported for connection with the hitch links by a rigid frame 34 and are respectively mounted on the frame in such manner as to permit alternate swinging movement thereof between elevated and ground engaging positions.

Figure 5:
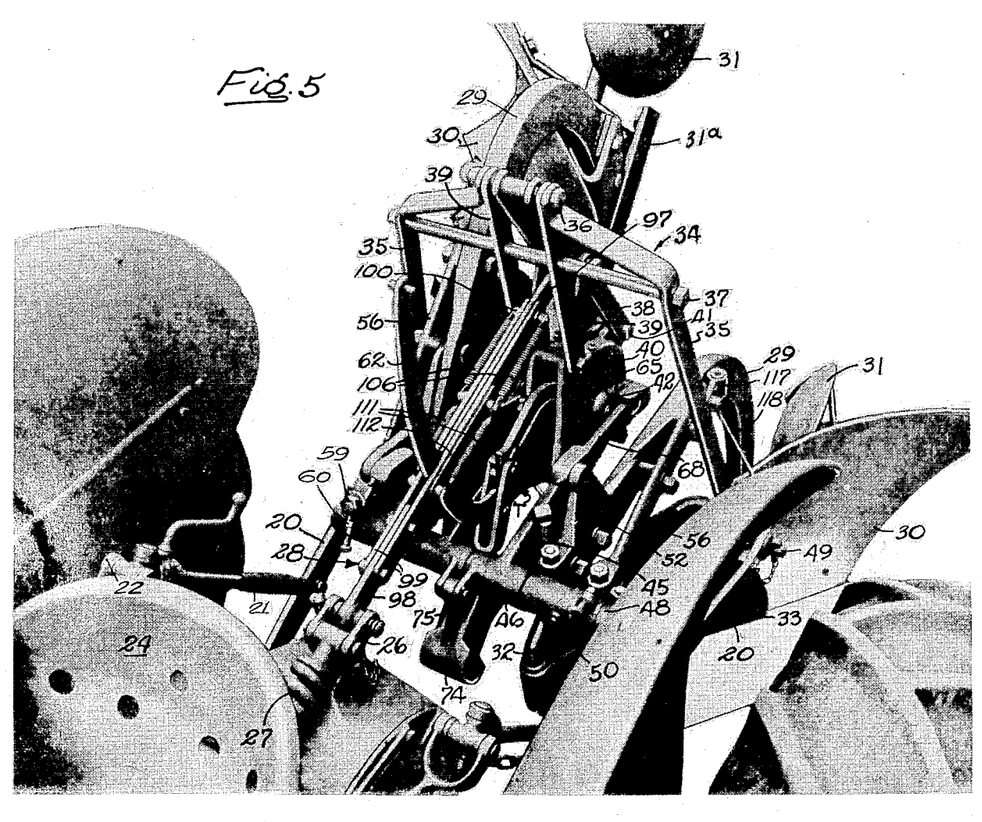
Fig. 5 is a fragmentary perspective view of the implement, looking from the front toward the rear of the same, and showing one of the plow units raised and the other lowered.

The frame 34 includes a pair of uprights 35 which are inturned and bolted together at the top by tie bolts 36 and 37 (Fig. 5). Two pairs of stays 38 and 39 are connected to the uprights 35 by the tie bolt 36 and their lower ends are bolted to opposite sides of a centrally located housing 40 as by bolts 41, 42. A pair of cross stays 43 also secured to the housing by bolts 42 are joined by a cross bolt 44 to midpoints on the stays 38 for bracing the assembly.

The opposite sides of the housing 40 have forwardly (toward the tractor end of the unit) extending arms 45 (Figs. 5 and 6) provided at their front ends with integral tubular bosses 46 to support a horizontal transverse shaft 47. This shaft has at each end a rearwardly extending arm 48 (Figs. 1 and 6) provided at its rear end with a laterally extending pin 49 for universal connection with the free rear ends of the lower draft links 20, as by means of ball and socket joints carried by said links. The frame parts (i. e., the uprights 35, tie bolts 36, 37, stays 38 and 39, housing 40, shaft 47 and arm 48) are all rigidly connected against relative movement, the lower ends of frame members 35 being connected with the rear ends of arms 48.

Figures 6, 7:
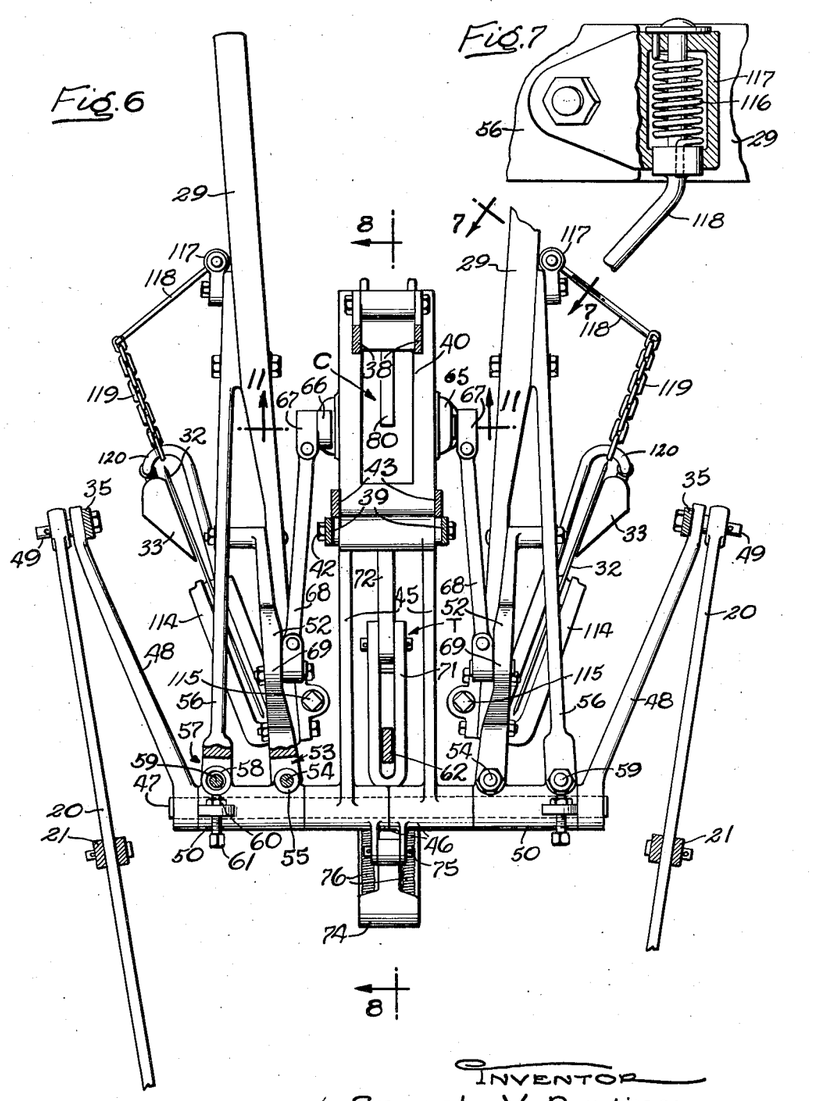
Fig. 6 is a fragmentary plan view of the implement with certain parts thereof broken away.
Fig. 7 is an enlarged detail sectional view taken substantially along the line 7—7 in Fig. 6.

Sleeves 50 (Fig. 6) are rotatably journaled on the shaft 47 between the arms 48 and bosses 46 and each supports a plowing unit for pivotal movement about the horizontal axis of shaft 47 between elevated inoperative and lowered operative positions, as well as for lateral movement to adjust the width of the furrow. Thus, the forward end of each plow beam has a plate 52 rigidly bolted thereto. The forward end of the plate is bifurcated, as at 53, to receive a pivot bolt 54 that extends through a boss 55 on the sleeve 50. Each beam also has a forwardly extending angularly related bracing member 56 which terminates in a bifurcated end 57 through which the member is secured to the sleeve 50 in the same fashion as the plate 52. However, as shown in Fig. 6, the bore 58 in the boss that receives the pivot bolt 59 for the member 56 is enlarged to provide a radial looseness in this fitting that permits the plow beam as a unit to be adjustably moved laterally through a small angle about the axis of the other pivot bolt 54. An accurate position of adjustment may be obtained by such means as a screw 61 (Fig. 6) carried by a boss on sleeve 50 and engaging the end of member 56. The adjusted position is secured by a jamb nut 60. After this position has been determined accurately, the pivot bolts 54 and 59 are tightened to maintain the adjustment.

General outline of implement actuating system

As an incident to bodily raising and lowering of the implement, relative movement takes place between the component elements of the jointed structure comprised by the hitch links 20, 28 and the implement frame 34. It is the relative movement between certain selected ones of such elements that is utilized herein as a source of power for operating the implement control mechanism.

Figure 2:
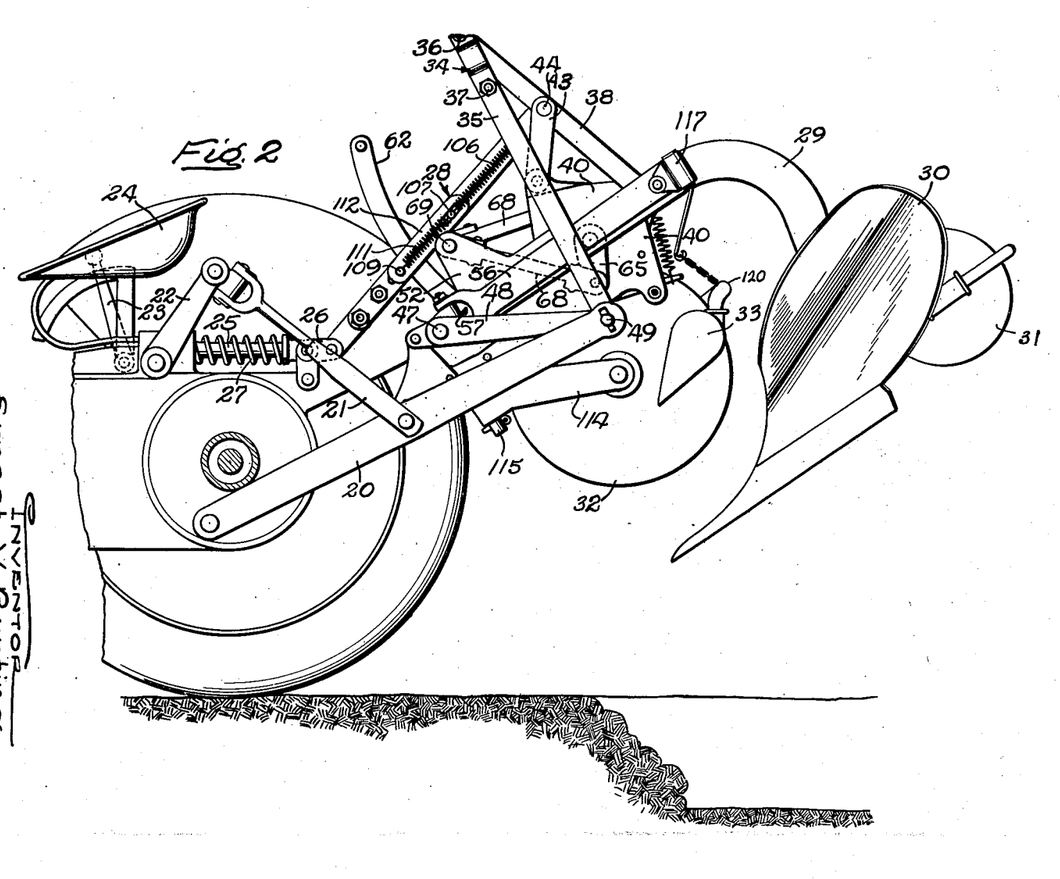
Fig. 2 is a side elevation of the implement showing the same in raised or transport position, the near rear wheel of the tractor being removed to expose the implement fully.
Figure 3:
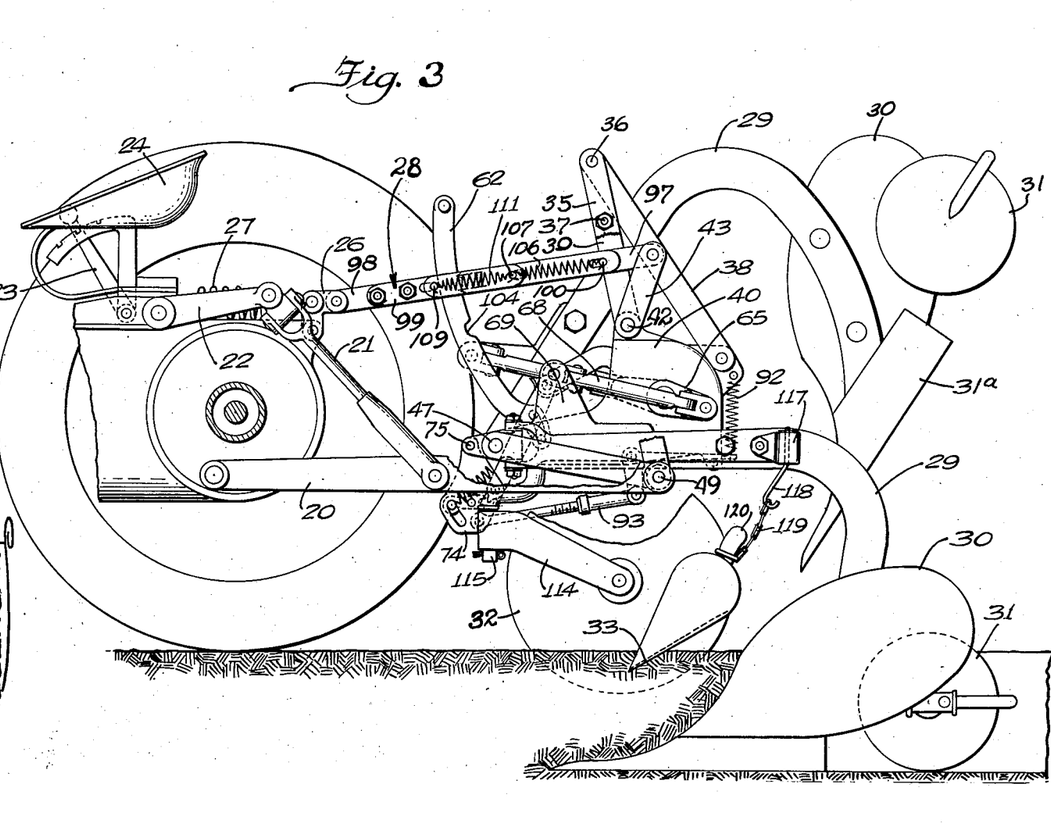
Fig. 3 is a side elevation similar to Fig. 2, but with one of the plow units shown in lowered or working position and with certain of the parts broken away.

By way of analysis of the relative movements noted above, it will be perceived upon comparison of Figs. 2 and 3 that as the links 20 rise to elevate the implement, the latter rocks rearwardly with reference to these links about the pivots at 49. The overhanging weight of the implement tends to rock it in that direction, the upper link 28 serving to limit the extent of the implement's rearward swing. So, too, when the implement is lowered from the transport position of Fig. 2 and assumes the working position of Fig. 3, the implement tends to rock forward about its pivots on the links 20, the ground reaction on the plows resulting in application of a compressive force on the upper link 28. There is thus a fore and aft rocking of the implement frame with reference to the lower draft links 20 as an incident to raising and lowering of the latter between transport and working positions.

Not only does relative movement take place between the implement frame 34 and the lower links 20, but also between the frame and the upper link 28. Comparison of Figs. 2 and 3 shows that these elements swing toward and from each other about the pivot at 44 (where the upper link attaches to the frame 34) in the manner of the opening and closing of a pair of jaws.

Considering the layout as a whole, it will be perceived that the upper and lower links 28, 20, the frame 34, and rear portion of the tractor comprise the four sides of a quadrilateral figure, jointed at its four corners so that it collapses and opens as the implement is raised and lowered.

In the illustrative arrangement, power is derived for implement control from the relative movement of the parts analyzed above through use of a stroke link 62 engageable with the upper link 28 and extending therefrom toward an actuator for an implement control mechanism. The actuator is, in this instance, a toggle linkage generally indicated at T. The stroke link 62 in operation converts the collapsing movement of the top link 28 toward the frame 34 into a thrust force for breaking the toggle through center in one direction, and translates the opening movement of the link 28 away from the frame 34 into a tension force effective to pull the toggle through center in the opposite direction. Each movement of the toggle is operative through an implement control mechanism, such as the pawl and ratchet mechanism generally indicated at C, to operate a crank type change-over device for shifting the plows. A more detailed description of the thrust link 62 and its associated top link, the toggle linkage, the pawl and ratchet mechanism, and the change-over device will be hereinafter set forth.

Crank type change-over device

The crank type change-over device here illustrated includes a crankshaft 63 (Fig. 11) journaled transversely in the housing 40 heretofore noted as being rigid with the implement frame 34 (Fig. 5). This housing includes a pair of laterally spaced plate members between which is located ratchet wheel 64 of the pawl and ratchet mechanism C, such wheel being fast on the shaft 63. Externally and on opposite sides of the housing 40, the crankshaft 63 carries crank 65 and 66 which are alike but have a relative 180 degree displacement. Each crank is connected through a pivoted link 67 to a connecting rod 68 that is in turn pivotally secured to the upper end of an arm 69 integral with the plate 52 (see Fig. 2).

Figure 1:
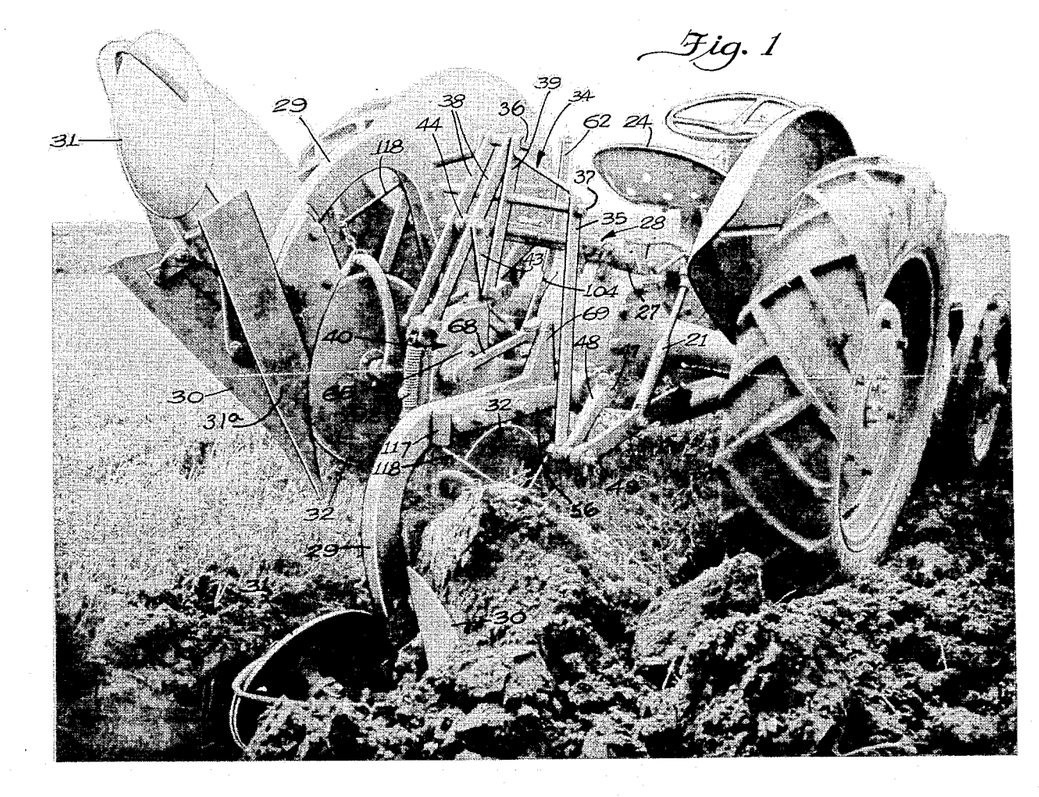
Figure 1 is a rear view of a tractor equipped with a two-way plow embodying the present invention.

The parts are so related that when the crank 65 is rotated through 180 degrees from its starting position, as shown in Figs. 1 and 5, it will swing the associated plow beam vertically, the direction being determined by the starting position of the crank. Rotation of the crank through the next 180 degrees will of course return the plow beam to its original position. When, as under actual operating conditions, one plow is up and the other down, an initial movement of the cranks through approximately ninety degrees will bring the plows to the same level. It will be noted that the connections between the cranks and the plow beams are such that when the plows are at their extreme upper and lower positions, the cranks are on dead center.

Ratchet mechanism and toggle linkage

Figures 8, 9, 10, 11, 12:
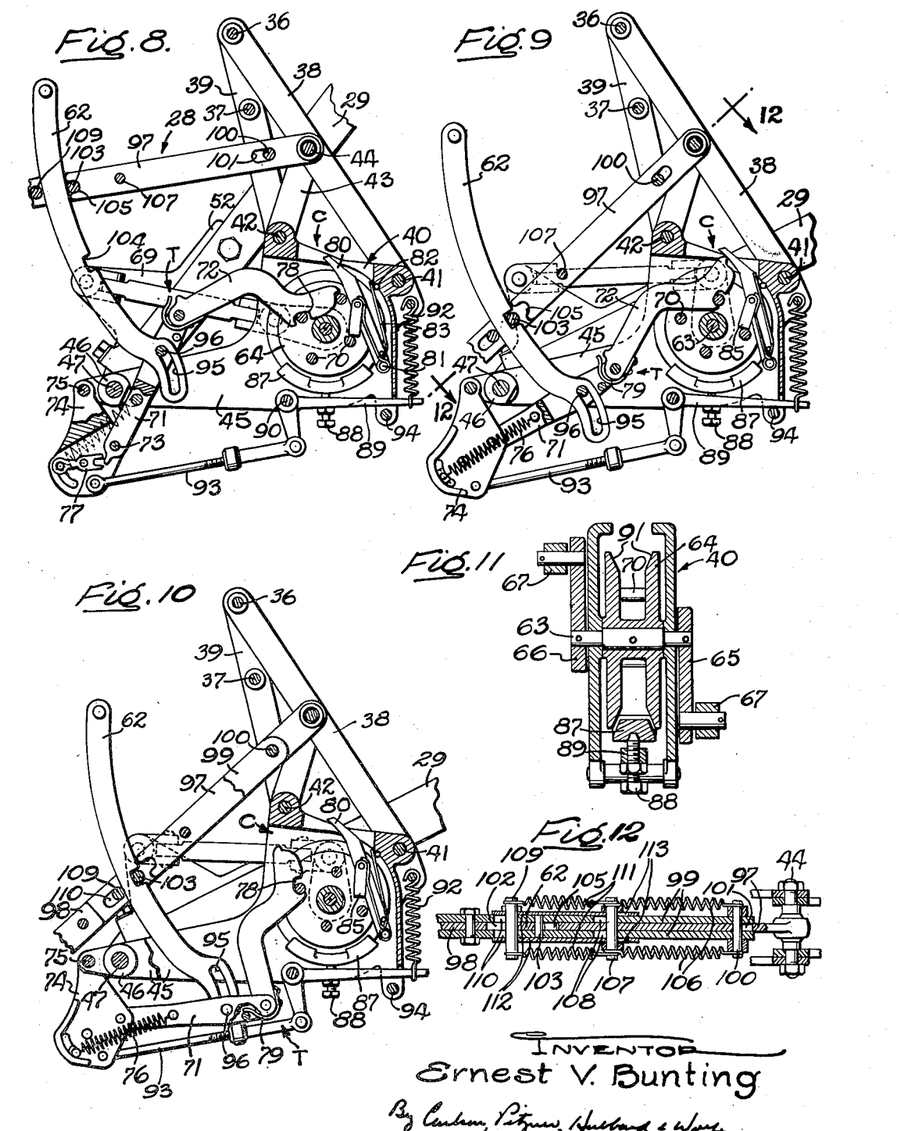
Fig. 8 is a detail sectional view taken substantially along the line 8—8 in Fig. 6.
Figs. 9 and 10 are stop motion views similar to Fig. 8 and showing progressive changes in the position of the linkages and ratchet mechanism shown.
Fig. 11 is an enlarged detail sectional view taken substantially along the line 11—11 in Fig. 6.
Fig. 12 is a detail sectional view taken substantially along the line 12—12 in Fig. 9.
Figure 13:
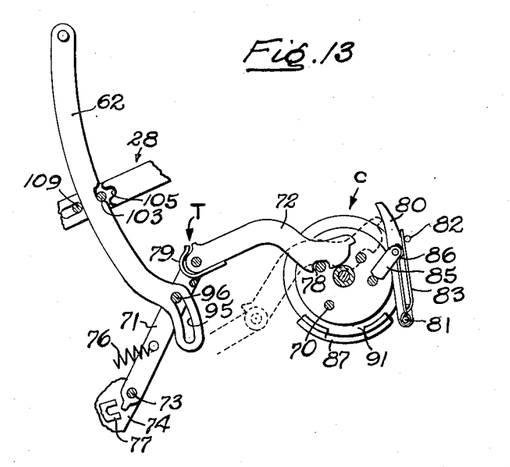
Figs. 13 and 14 are views similar to Fig. 8, but showing only a portion of the mechanism appearing in the latter figure, and illustrating further moved positions of the same in the course of operation.
Figures 14, 15:
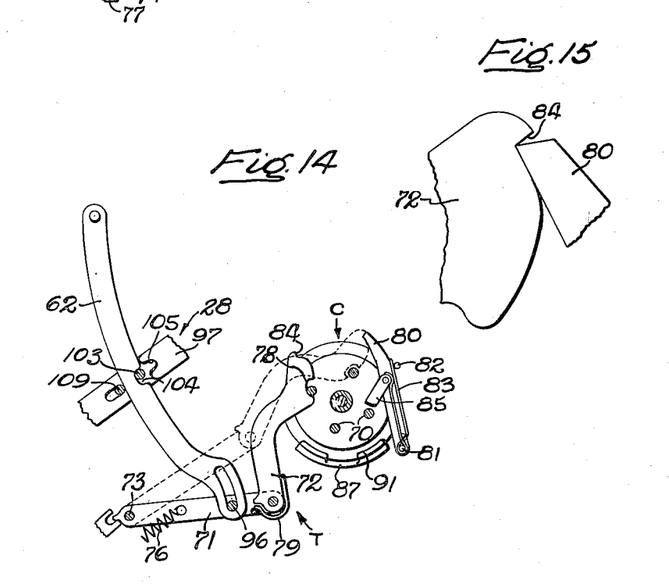
Fig. 15 is an enlarged fragmentary detail view of an end of one of the links appearing in Figs. 13 and 14 and the cooperating dog.

The cranks 65, 66 are driven through the ratchet wheel 64 which, as may be seen in Fig. 11, has two spaced-opposed flanges supporting therebetween a circular series of ratchet pins 70. These pins are arranged for successive engagement by a pawl which in this instance is formed as an integral part of the end portion of one of the toggle arms.

The toggle mechanism (see Figs. 8 to 10, inclusive, 13 and 14) is comprised of two pivotally joined toggle arms 71, 72, one of which (herein the arm 71) is pivoted as at 73 on a swinging housing 74 pivoted, as at 75, between the forward ends of the housing arms 45. Springs 76 acting between the toggle arm 71 and an end of a pivoted dog 77, engaging the end of the toggle arm, assists the toggle in snapping past dead center in either direction. The free end of the other toggle arm 72 is provided with a notch 78 spaced inwardly of its extreme end and arranged for successive engagement with each of the ratchet pins 70.

With reference to the ratchet pins 70, the series in the present instance comprises four pins, one opposed pair of which is spaced further from the axis of the wheel 64 than the other pair. The closer pair, as shown in Fig. 8, is arranged for engagement by the toggle arm notch 78 when the toggle is in its upper position, this being the position of the toggle when one of the plow units is in its raised position and other in its lowered position. The pins of the other pair are engaged when the toggle is in its lower position.

Assuming the relationship of parts shown in Fig. 8 as a starting position, if the toggle is caused to break downwardly to the position shown in Fig. 9, the engagement between the notch 78 and one of the ratchet pins 70 will produce rotation of the ratchet wheel and the cranks associated therewith through approximately, although not necessarily exactly, 90 degrees. The toggle arm 72 is, as shown, a somewhat V-shaped member and the notch 78 therein is so arranged that when the toggle arms have reached their fully extended position the further movement of the toggle arm 72 upon the break-through of the toggle will swing the notch clear of the pin engaged thereby. At the completion of the break-through movement, the parts have reached the position shown in Fig. 10 and the notch 78 is positioned for engagement with the next ratchet pin in the series. Such means as a spring 79 bearing between the toggle arms may urge the arm 72 to effect engagement between the notch and the ratchet pin. The return movement of the toggle in an upward direction will again impart approximately a ninety degree rotational movement to the ratchet wheel (see dotted position of Fig. 14).

During these movements, the engagement of the notch with any ratchet pin has prevented the mechanism from accidentally moving "out of time" since the opposite sides of the notch prevent inadvertent disengagement of the ratchet wheel during the time that a ratchet pin is engaged in the notch. Stated in other words, the snug engagement of the notch with one of the ratchet pins in both the push and pull directions insures that such elements are maintained in proper phase with respect to one another. Means must be provided, however, for insuring disengagement of the notch from the ratchet pin during the upward break-through of the toggle. To this end an arm 80 (Figs. 13, 14 and 15) is pivotally mounted as at 81 on the housing 40 for swinging movement between a stop 82 on the housing and a position of abutment with the ratchet pins, the arm being urged toward the latter abutting position by a spring 83. The free end of the arm is disposed in the arcuate path described by a lip or shoulder 84 on the extreme end of the toggle arm 72, as the arm moves toward its extended position in the upward movement of the toggle. This relationship is shown in dotted outline in Fig. 14. Upon the subsequent break-through, the arm 72 pivots about the point of engagement between the arm 80 and the lip 84 to swing the notch free of the ratchet pin for retracting movement. The arm 80 is also provided with a dog 85 which is spring-pressed as at 86 to project yieldingly into the path of the ratchet pins. The dog is arranged to swing behind a ratchet pin at the end of each movement of the ratchet wheel to hold the wheel against reverse rotation.

Brake means is provided for holding the ratchet wheel against other than driven movement, which brake means is automatically released or engaged immediately preceding or following the driving action of the toggle. Referring particularly to Fig. 8, a brake shoe 87 is mounted through an adjusting screw 88 on one arm of a bell crank lever 89 pivoted as at 90 between the housing plates. The brake is arranged to engage beveled surfaces 91 (Fig. 11) formed on the inner peripheral edges of the ratchet wheel flanges. A tension spring 92 anchored at its respective opposite ends to the housing and to the bell crank lever urges the brake into holding engagement. A connecting rod 93 pivotally joins the other leg of the bell crank lever with the swinging housing 74 on which the toggle arm 71 is mounted. By this arrangement the initial movement of the toggle mechanism in either direction will first swing the housing 74 to retract the brake, the retraction being limited by a stop pin 94 carried by the housing in the path of movement of the brake-carrying arm of the bell crank lever. Therefore after the toggle action will function to rotate the ratchet wheel as has been described and the brake will be held in retracted position until the toggle breaks past center. When this occurs and the toggle snaps to its opposite position, the retracted brake mechanism is released to the brake applying force of the spring 92.

*Stroke link and top link*

As best shown in Figs. 8 to 10, inclusive, the stroke link 62 occupies a generally vertical position extending between the upper hitch link 28 and the arm 71 of the toggle mechanism. The stroke link is generally arcuate in shape, having a curvature approximately centered at the pivot at 44 between the top link 28 and frame 34. At its lower end, adjacent to the arm 71 the link 62 is provided with a vertically elongated slot 95 for engagement with the pin 96 carried by the toggle arm. The slot permits of relative movement of the arm during the toggle break-through. The upper end of the link is arranged for detachable connection with the upper hitch link.

The upper or top hitch link 28 (see Figs. 5 and 12) is a composite member formed of a number of sections including an implement end section or bar 97 and a tractor end section or bar 98, both of which carry ball and socket joints for connection, respectively, with the cross bolt 44 on the implement frame and the shackle 26 on the tractor. A pair of rearwardly extending intermediate sections or bars 99 are rigidly secured one on each side of the tractor end section 98 and extend rearwardly in spaced relation to receive therebetween the forwardly extending implement end section 97. A through pin 100 (Fig. 12) rigid with the ends of the intermediate sections extends through a longitudinal slot 101 in the implement end section 97. The two end sections 97, 98 are spaced apart endwise between the intermediate sections to provide a vertical space or slot 102 in the top link assembly through which the upper end of the stroke link 62 may extend.

Traversing the slot 102 is a latch pin 103 carried by the intermediate sections for engagement by a latching notch 104 (see Figs. 8, 9 and 10) appropriately formed in the stroke link 62 intermediate its ends. The pin 103 is also engageable by a shielding notch 105 in the end face of the implement end section 97 upon a relative movement of the intermediate and end sections toward each other. Such engagement is normally maintained by compression in the upper link (see Fig. 8). The shielding notch 105 by straddling the latch pin 103 serves to disable it, thus preventing engagement with the latching notch 104 in the stroke link. A pair of tension springs 106, each of which has one end anchored to the pin 100 and the other end to an intermediate pin 107 carried by the implement end section 97 and extending through longitudinal slots 108 in the intermediate sections 99, serves to assist in the unshielding of pin 103 when the implement is lifted and the upper link is placed in tension (see Fig. 12).

The stroke link 62 is normally urged toward the pin 103. Thus, a back-up pin 109 which traverses the slot 102 on the side of the link opposite the notch 104 and extends through longitudinal slots 110 in the intermediate sections 99 is urged into engagement with the link by springs 111 bearing between the back-up pin 109 and the intermediate pin 107. The back-up pin 109 is connected with intermediate pin 107 by side plates 112 for retraction from the link 62 when the implement end section moves forwardly under compression. The plates 112 are slotted longitudinally, as at 113, for movement relative to pin 107, thereby permitting the back-up pin to be retracted independently by manually holding link 62 forward to prevent engagement of pin 103 in notch 104.

The composite upper hitch link construction insures that the upper link 28 and the stroke link 62 will be positively connected at the proper time in the operation of the device and prevents these links from becoming accidentally connected at any other time. It permits the two links to move relative to each other except when the change-over mechanism is being actuated; and it further enables the operator to disable the auxiliary power means at will.

Considering the operative relationships between the upper hitch link 28 and the stroke link 62, it will be noted (Fig. 8) that when the mechanism is set for a plowing operation, the notch 104 in the stroke link 62 is located below the upper link. During plowing operation of the implement the upper link is under compression and as a result its implement end section 97 and intermediate sections 99 have moved relatively toward each other to effect engagement between the pin 103 and notch 105. This engagement hoods or shields the pin 103 preventing engagement between the notch 104 and this pin. Such movement has also placed the springs 106 under tension to insure that when the compressive force on the upper link 28 has been relieved, its implement end section and the intermediate sections will move relatively apart and expose the latch pin 103 for engagement by the notch 104.

Figure 4:
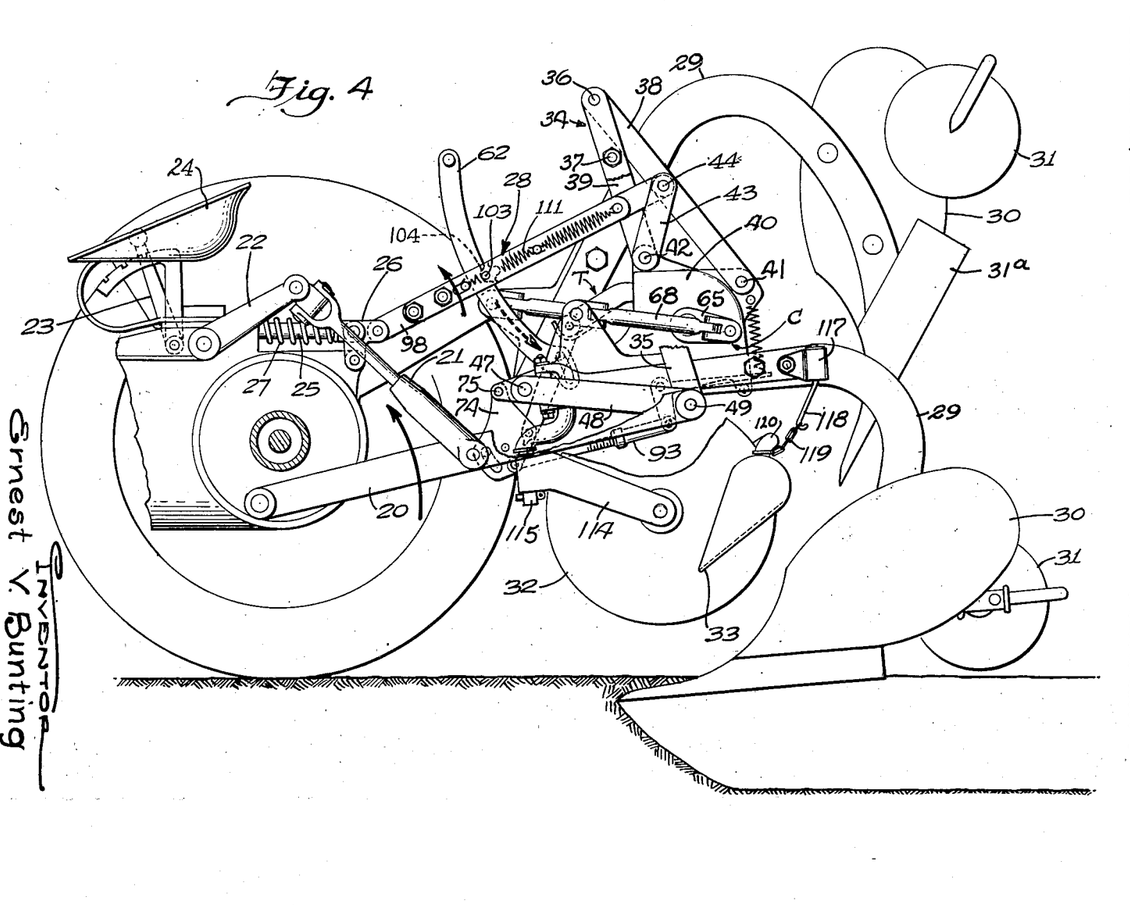
Fig. 4 is a view similar to Fig. 3 but showing the lowered plow unit moving toward raised position.

Since the compression force in the upper hitch link 28 is the result of the force of the horizontal resistance on the plow in operation, this compression force is released when the implement is lifted. Consequently, the then exposed pin 103 will be engaged by the notch 104 as the notch is brought opposite the pin by the collapse of the hitch linkage in the upward movement of the implement. The continued upward movement of the latter will produce a thrust force in the stroke link 62 for breaking the toggle mechanism downwardly. The relative movements which occur are indicated in Fig. 4, in which the amounts of movement are represented by the lengths of the arrows and the thrust is indicated by the dotted arrow. Subsequently, when the implement is lowered the expansion of the hitch linkage produces a tension force in the link 62 to break the toggle mechanism upwardly. Since each movement of the toggle mechanism drives the ratchet and the associated cranks through approximately 90 degrees, each plow beam will be swung from its upper or lower position, as the case may be, to a first position in which the beams are at about the same horizontal level and then to a second position in which the reversal or change-over of the plows has been completed.

When at the completion of a change-over cycle the lowermost plow has penetrated the ground to its proper depth of cut, the upper link 28 will again be under compression with the link sections moved together to shield the pin 103 and release the notch 104 from its engagement therewith. The implement is then in condition for controlled operation in the same manner as described in the above-mentioned Ferguson patents and will remain so until the operator, by again actuating the hydraulic system to effect a vertical movement of the hitch links, automatically produces another change-over.

Should the operator wish to raise and lower the implement without producing a change-over, he simply pulls forward on the conveniently presented upper end of the stroke link 62 to prevent engagement between the notch 104 and pin 103 as the hitch linkage collapses and extends in the vertical movements thereof. This same manual control is important in the operations of assembling and disassembling the implement from the tractor. Thus, as has been pointed out, at the end of the first phase of the change-over the initial 90 degree movement of the cranks has shifted the plows to an approximately even level. At the same time the implement as a whole has been elevated so that the mechanism at that time is in transport condition with the implement raised and the plow beams level and balanced. If the operator before lowering the implement from this position pulls forwardly on the stroke link 62 to disengage notch 104 from pin 103 (Fig. 9), the second phase of the change-over will not result from the lowering of the hitch links. Consequently, the plows while on the same level may be lowered to the ground and will rest evenly thereon while the implement is being disengaged from the tractor by releasing the upper link from the shackle 26 and the lower links 20 from the arms 48. Re-assembly of the implement on the tractor is, of course, just as simply accomplished.

*Coulter and jointer assemblies*

Each coulter and jointer assembly is provided with means for swinging it laterally outwardly to clear the housing 40 and associated parts as the corresponding plow is lifted from the ground. Lateral motion of the coulter and jointer assemblies is afforded by pivoting the coulter fork 114 on the vertically extending lower end portions of stems 115 fixed to the plow beams.

When either of the coulters 32 is in the ground, the reaction of the ground tends to swing the coulter into position in which the axis of rotation for the coulter is transverse to the path of travel. As soon as one of the coulters 32 is lifted out of the ground, however, it is swung laterally by a constantly applied spring bias. For the latter purpose torsion springs 116 (Figs. 6 and 7) are arranged within brackets 117 secured to the plow beams 29 to swing rods or arms 118 outward. The outer ends of the latter rods are flexibly connected through chains 119 with the jointer supporting arms 120 (Fig. 6).

I claim as my invention:

1. In an implement for attachment to a tractor having a vertically swingable power operated draft link trailing therefrom, a generally upright frame, means for pivotally connecting the lower portion of said frame to the draft link for fore and aft rocking motion of the frame on such link, means including an open link pivotally connected at one end to the upper portion of said frame and located to project forwardly therefrom for pivotal attachment to the tractor for causing said frame to rock fore and aft relative to said upper link as an incident to the vertical swing of said power operated draft link, a generally arcuate link disposed substantially concentrically with the axis of pivotal connection between said upper link and frame and projecting into proximity with them, means for securing said arcuate link to said upper link, and a member pivoted on said frame and connected to said arcuate link for movement relative to said frame in response to the movement of said arcuate link upon rocking of said frame by the draft link.

2. In an implement for attachment to a tractor having a vertically swingable power operated draft link trailing therefrom, a generally upright frame, means for pivotally connecting the lower portion of said frame to the draft link for fore and aft rocking motion of the frame on such link, means including an open link pivotally connected at one end to the upper portion of said frame and located to project forwardly therefrom for pivotal attachment to the tractor for causing said frame to rock fore and aft relative to said upper link as an incident to the vertical swing of said power operated draft link, a generally arcuate link disposed substantially concentrically with the axis of pivotal connection between said upper link and frame and projecting into proximity with them, means for securing said arcuate link to said upper link, a positionally adjustable element connected to said frame, means including a toggle linkage carried by said frame for shifting said element, and means for connecting said arcuate link to said toggle linkage for actuation of the latter by said arcuate link as the arcuate link moves with reference to the frame upon rocking of the latter by the draft link.

3. In an implement for attachment to a tractor having a vertically swingable power operated draft link trailing therefrom, a generally upright frame, means for pivotally connecting the lower portion of said frame to the draft link for fore and aft rocking motion of the frame on such link, means including an open link pivotally connected at one end to the upper portion of said frame and located to project forwardly therefrom for pivotal attachment to the tractor for causing said frame to rock fore and aft relative to said upper link as an incident to the vertical swing of said power operated draft link, a generally arcuate link disposed substantially concentrically with the axis of pivotal connection between said upper link and frame and projecting into proximity with them, said upper link having a longitudinal slot therein slidably receiving said arcuate link, means for releasably latching the portion of said arcuate link in said slot to said upper link, means operable in response to imposing of a compression load on said upper link for releasing said latching means and operable in response to imposing of a tensional load on said upper link for re-engaging said latching means, and a member pivoted on said frame and connected to said arcuate link for movement by the arcuate link relative to said frame in response to movement of said arcuate link as the frame is rocked by the draft link.

4. In an implement for attachment to a tractor having a vertically swingable power operated draft link trailing therefrom, a generally upright frame, means for pivotally connecting the lower portion of said frame to the draft link for fore and aft rocking motion of the frame on such link, means including an open link pivotally connected at one end to the upper portion of said frame and located to project forwardly therefrom for pivotal attachment to the tractor for causing said frame to rock fore and aft relative to said upper link as an incident to the vertical swing of said power operated draft link, a generally arcuate link disposed substantially concentrically with the axis of pivotal connection between said upper link and frame and projecting into proximity with them, said upper link including a pair of bars disposed in spaced end-to-end relation, the front one of said bars having a pair of guide members rigid with its rear end and defining a slot between them in which the forward end of the rear bar is slidably received, a latch pin extending transversely across said slot, said arcuate link projecting upwardly through said slot and having a notch therein engageable with said latch pin to connect said arcuate link to said upper link, the forward end of said rear bar having a notch therein adapted to receive and shield said latch pin against engagement of the latter by the notch in said arcuate link, and spring means for yieldably urging said rear bar forwardly into said slot for engagement of its notched forward end with said latch pin, the imposition of a tension load on said upper link serving to withdraw said rear bar from said latch pin to free the latter for engagement by the notch in said arcuate link.

5. An extensible composite implement attaching link comprising, in combination, a pair of bars disposed in spaced end-to-end relation and adapted to be trailingly mounted on a tractor, the front one of said bars having a pair of guide members rigid with its rear end and defining a longitudinally extending slot between them in which the forward end of the rear bar is slidably received, spring means for yieldably urging said rear bar forward into said slot, a latch pin extending transversely across said slot, and the forward end of said rear bar being notched to receive said latch pin upon endwise advance of said rear bar toward the same.

6. An extensible composite implement attaching link comprising, in combination, a pair of overlapped elongated members movable endwise with reference to each other, a latch element carried by one of said members, the other of said members having means thereon for disabling said latch element upon engagement therewith, said members being slidable longitudinally toward each other into a position of maximum overlap for engagement of said disabling means with said latch element upon application of an endwise compressive force to said pair of members, and a spring for yieldably resisting movement of said members away from each other.

7. In an implement attachable to a pair of laterally spaced draft links trailingly pivoted on the rear end of a tractor and swingable vertically in unison by power unit on such tractor, the combination of a frame, means for pivotally attaching said frame to the draft links for fore and aft rocking motion thereon, means including an extensible third link pivotally connected at its rear end to said frame and adapted to be pivotally connected at its front end to the tractor for rocking said frame about its points of pivotal attachment to the draft links as an incident to vertical movement of the latter, a ground engaging device, means including a connection from said device to said frame for applying the force of ground reaction on said device as a thrust to said frame urging it to rock forward when said frame is in lowered working position and for applying the suspended weight of said device to said frame as a force tending to rock the latter rearwardly when said frame is elevated, whereby said third link is placed under compression and tension respectively when said frame is in lowered and elevated positions, a positionally adjustable element carried by said frame, actuating means for imparting successive steps of unidirectional movement to said element in response to corresponding successive rocking motions of said frame both fore and aft, and means for automatically disabling said actuating means whenever said third link is under compression.

8. In an implement for attachment to a tractor having a power operated vertically swingable hitch link trailing therefrom, the combination of a frame adapted to be pivotally mounted on the hitch link to rock fore and aft on the latter, means including a connection from said frame to the tractor for effecting fore and aft rocking of said frame on the hitch link as an incident to raising and lowering of the frame by the hitch link between an elevated transport position and a lowered working position, a toggle linkage on said frame including a pair of toggle links pivoted together end-to-end and spring stressed to snap through dead center in opposite directions to alternatively available collapsed positions, a positionally adjustable element carried by said frame and shiftable by said toggle linkage as the latter passes through dead center, and means for actuating said toggle linkage from one collapsed position to the other in response to the fore and aft rocking of said frame incident to raising and lowering of the same between transport and working positions.

9. In an implement, the combination of a positionally adjustable element, a rotatable ratchet wheel drivingly connected to said element, a toggle linkage including a pair of toggle links pivotally connected end-to-end and spring stressed to snap through dead center in passing between alternatively available collapsed positions, and pawl means on the outer end of one of said links for advancing said ratchet wheel a step as an incident to each passage of said toggle linkage through dead center.

10. In an implement, the combination of a positionally adjustable element, a rotatable ratchet wheel drivingly connected to said element, a toggle linkage including a pair of toggle links pivotally connected end-to-end and spring stressed to snap through dead center in passing between alternatively available collapsed positions, pawl means on the outer end of one of said links for advancing said ratchet wheel a step as an incident to each passage of said toggle linkage through dead center, actuating means for alternatively pushing and pulling on one of said links to swing such linkage through its dead center position in opposite directions and thereby impart successive increments of movement to said element, a releasable brake normally engaged with said ratchet wheel, and means operable by said actuating means for releasing said brake only as said toggle linkage passes in the direction of dead center.

11. In an implement, the combination of a positionally adjustable element, means including a rotatable ratchet wheel and cooperating operating pawl for shifting said element, a movable actuator for said pawl, a normally engaged releasable brake for said ratchet wheel, and means for sequentially releasing said brake and shifting said actuator as well as for effecting reengagement of said brake upon completion of a stroke of said pawl, said latter-named means including an over-center spring mechanism for producing abrupt operation of the brake.

12. In an implement, the combination with a positionally adjustable element having releasable means normally engaged to hold the same against movement, of means automatically operable to sequentially release said holding means, impart a step of movement to said element, and effect restoration of said holding means to its normal engaged condition, said latter-named means including an over-center spring mechanism for initiating release and reengagement of the holding means.

13. In an implement, the combination of a frame adapted for attachment to a power lift mechanism on a tractor, a positionally adjustable element carried by said frame, means including a ratchet wheel drivingly connected to said element for shifting the latter step-by-step, a drive pawl for said ratchet wheel, means for imparting successive strokes of unidirectional movement to said pawl as an incident to vertical movement in either direction of said frame by the power lift between elevated transport and lowered working positions, and means associated with said pawl and ratchet wheel for preventing disengagement of said stroke imparting means from the ratchet wheel while the ratchet wheel is idle to thereby prevent the same from getting out of time with the raising and lowering of said frame.

14. In an implement having a frame adapted for attachment to a power lift mechanism on a tractor for elevation thereby, the combination of a positionally adjustable element carried by said frame, means including a ratchet wheel drivingly connected to said element for shifting the latter step-by-step in response to each raising and lowering movement of said frame, said wheel having a generally circular series of abutments thereon, a generally reciprocable drive pawl for said ratchet wheel presenting a laterally facing notch engageable with individual ones of said abutments to connect said pawl drivingly to said wheel, means including a biasing spring for yieldably retaining said pawl urged toward said wheel to thereby prevent inadvertent turning of the latter while an abutment is lodged in said notch, and means for applying a withdrawing movement to said pawl for automatically disengaging said notch from an abutment preliminary to a stroke of said pawl after said notch is engaged with an abutment.

15. In an implement attachable to a vertically swingable power-operated draft link trailingly pivoted on the rear end of a tractor, the combination of a frame, means for pivotally connecting said frame to the draft link for fore and aft rocking motion on the latter, means including a top link pivotally connected at its rear end to said frame and adapted to be pivotally connected at its forward end to the tractor for rocking said frame fore and aft on the draft link as an incident to vertical movement of the latter, a generally vertically disposed stroke link located with its upper end portion projecting upwardly above the fore portion of said top link in position to be conveniently grasped by the driver of the tractor, means for releasably latching said stroke link to said top link, spring means yieldably urging said stroke link broadwise in a rearward direction toward latched position, whereby a manual pull on said stroke link in a forward direction prevents latching of the same to said top link, and a positionally adjustable element connected in driven relation with said stroke link and carried by said frame.

16. In an implement for attachment to a vertically movable, power-operated draft link trailingly pivoted on the rear end of a tractor, the combination of a frame pivotally connectable to the draft link, an upper link pivotally connected to said frame and having means thereon for pivotally connecting the same to the tractor for approach and retreat of said upper link relative to said frame as an incident to raising and lowering of the latter by the draft link between transport and working positions, a pair of plows pivoted on said frame, a change-over device operable step-by-step to simultaneously shift said plows in opposite directions relative to each other between raised and lowered positions therefor and in successive steps in which each step for a plow is approximately one-half of the total length of travel for such plow between its raised and lowered positions, a toggle linkage spring stressed to snap to alternate extreme positions upon passage through dead center, means for snapping said toggle linkage through dead center in response to each approach and retreat of said upper link relative to said frame incident to raising and lowering of the latter between transport and working positions, and means for imparting to said change-over device a step of movement in response to each passage of said toggle linkage through dead center.

17. In an implement for attachment to a vertically movable, power-operated draft link trailingly pivoted on the rear end of a tractor, the combination of a frame pivotally connectable to the draft link, an upper link pivotally connected to said frame and having means thereon for pivotally connecting the same to the tractor for approach and retreat of said upper link relative to said frame as an incident to raising and lowering of the latter by the draft link between transport and working positions, a pair of plows pivoted on said frame, a change-over device including a pawl and ratchet type drive mechanism and operable step-by-step to simultaneously shift said plows in opposite directions relative to each other between raised and lowered positions therefor with a shift of each plow through approximately one-half of the total length of travel therefor between its extreme raised and lowered positions in response to each step of advance of said pawl and ratchet mechanism, a toggle linkage spring stressed to snap between alternate extreme positions therefor upon passage through dead center, means for moving said toggle linkage through dead center in response to each advance and retreat of said upper link relative to said frame incident to raising and lowering the latter between transport and working positions, and means for actuating said pawl and ratchet mechanism for a step of advance of the same upon each passage of said toggle linkage through dead center.

18. In an implement for attachment to a tractor-borne, power-operated draft linkage including vertically movable upper and lower links, the combination of means including a frame pivotally connected to the trailing ends of said upper and lower links at vertically spaced points on such frame for effecting approach and retreat of the links relative to each other with rise and fall of the same, a ratchet mechanism carried by said frame and including a rotatable ratchet wheel and actuating pawl therefor, a reciprocable stroke link, means for detachably connecting said stroke link to the upper link in such position that said stroke link extends downward toward the plane of the lower link, whereby said stroke link is reciprocated relative to the lower link generally transversely of the latter as an incident to approach and retreat of the upper and lower links relative to each other, means for actuating said pawl in response to each successive stroke of said stroke link relative to the lower link and irrespective of the direction of such stroke, two plows pivotally attached to said frame and capable of relative up and down movement, a change-over device connected to each plow and operable step-by-step to simultaneously raise one plow and lower the other, and means for drivingly connecting said ratchet wheel to said device.

19. In an implement for attachment to a tractor-borne, power-operated draft linkage including vertically movable upper and lower links, the combination of means including a frame pivotally connected to the trailing ends of said upper and lower links at vertically spaced points on such frame for effecting approach and retreat of the links relative to each other with rise and fall of the same, a ratchet mechanism carried by said frame and including a rotatable ratchet wheel and actuating pawl therefor, a reciprocable stroke link, means for releasably latching said stroke link to the upper link in such position that said stroke link extends downward toward the plane of the lower link, whereby said stroke link is reciprocated relative to the lower link generally transversely of the latter as an incident to approach and retreat of the upper and lower links relative to each other when the stroke link is latched to the upper link, means for actuating said pawl in response to each successive stroke of said stroke link relative to the lower link and irrespective of the direction of such stroke, two plows pivotally attached to said frame and capable of relative up and down movement, a change-over device connected to each plow and operable step-by-step to simultaneously raise one plow and lower the other, means for drivingly connecting said ratchet wheel to said device, and means for automatically disengaging said latching means when either of said plows is in ground engagement and for automatically re-engaging said latching means when the plows are lifted out of ground engagement.

20. In an implement for a tractor having a link trailingly pivoted thereon and also having a power lift device for raising an implement, the combination of an implement frame, means pivotally connecting said frame to the link for scissoring of the two toward and from each other as an incident to raising and lowering of the frame, an auxiliary linkage including a pair of links pivoted together to swing toward and from each other, means pivotally connecting respective ones of said auxiliary links to the first-named link and to said frame for effecting scissoring of said auxiliary links toward and from each other in unison with like movement of said frame and said first-named link, the point of pivotal connection of said auxiliary links to each other being offset with respect to the point of pivotal connection of said frame and said first-named link, wherefore each of said auxiliary links moves relative to its associated one of the latter elements in course of the scissoring, an element positionally adjustable with reference to said frame, and means for shifting said last mentioned element in response to movement of one of said auxiliary links as an incident to the raising and also lowering of said frame.

21. In an implement for a tractor having a link trailingly pivoted thereon and also having a power lift device for raising an implement, the combination of an implement frame, means pivotally connecting said frame to the link for scissoring of the two toward and from each other as an incident to raising and lowering of the frame, an auxiliary linkage including a pair of links pivoted together to swing toward and from each other, means pivotally connecting one of said auxiliary links to said frame and the other of said links being pivotally interconnected with the tractor for effecting scissoring of said auxiliary links toward and from each other in unison with like movement of said frame and said first-named link, the point of pivotal connection of said auxiliary links to each other being offset with respect to the point of pivotal connection of said frame and said first-named link, wherefore each of said auxiliary links moves relative to its associated one of the latter elements in the course of the scissoring, an element positionally adjustable with reference to said frame, and means for shifting said last mentioned element in response to movement of one of said auxiliary links as an incident to the raising and also lowering of said frame.

22. In an implement for attachment to a tractor-borne, power-operated draft linkage pivoted to swing vertically between elevated and lowered positions, the combination comprising a frame having pivotal connections with the draft linkage at vertically spaced points for effecting fore and aft rocking motion of said frame relative to the draft linkage with rise and fall of the same, a mechanism supported on said frame for unidirectional movement relative thereto, a toggle linkage carried by said frame and disposed in position to impart successive steps of unidirectional movement to said mechanism in response to straightening movement of said toggle linkage from a position on either side of dead center, a stroke link disposed for reciprocation relative to the draft linkage as an incident to fore and aft rocking of said frame relative thereto, said stroke link being detachably connected at one end to said hitch linkage and connected at the opposite end to said toggle linkage for actuation of the latter from either side of dead center incident to each successive reciprocation of said stroke link.

23. In an implement attachment for a tractor having a vertically movable power-operated draft linkage thereon, the combination with a positionally adjustable element, of a first means connected for the application of successive increments of unidirectional movement to said positionally adjustable element in response to successive actuating forces of opposite direction, and a second means connected with the draft linkage and said first means for application to the latter of successive actuating forces in opposite directions respectively in unison with successive raising and lowering movements of the draft linkage, and means for selectively disconnecting said second means from the draft linkage.

24. In an implement for attachment to a power operated draft linkage including vertically movable upper and lower links pivoted on a tractor, the combination of a frame, means for pivotally connecting said frame to the trailing ends of said upper and lower links at vertically spaced points on such frame for effecting approach and retreat of the links relative to each other with rise and fall of the same, an element supported from said frame for movement relative thereto, a rotary mechanism supported on said frame for unidirectional movement relative thereto and connected with said element for moving the same, a toggle linkage carried by said frame and disposed in position to impart successive steps of unidirectional movement to said rotary mechanism and said element in response to straightening movement of said toggle linkage from a position on either side of dead center, a stroke link disposed for reciprocation in response respectively to the approaching and retreating movements of the links relative to each other, said stroke link being connected at one end to the upper link and connected at the opposite end to said toggle linkage for actuation of the latter from either side of dead center incident to each successive reciprocation of said stroke link.

25. In an implement attachable to a vertically movable power-operated draft link trailingly pivoted on the rear end of a tractor, the combination of a frame, means for pivotally attaching said frame to the draft link to rock fore and aft thereon, means for interconnecting said frame with the rear end of the tractor for effecting rocking of said frame fore and aft on the draft link as an incident to vertical movement of the latter between an elevated transport position and a lowered working position, a pair of plow bottoms, means for pivotally attaching said plow bottoms side by side to said frame for relative up and down movement thereon, an automatic change-over means supported on said frame and operable as an incident to the rocking of said frame ensuing upon raising of the same to transport position for automatically shifting said plow bottoms into a position of substantial lateral alinement relative to each other and additionally operative as an incident to rocking of said frame ensuing upon lowering of the same to working position for lowering one of the plow bottoms relative to said frame and raising the other, and means for selectively disabling said change-over means to permit lowering of the implement with both said plow bottoms in laterally alined position.

26. In an implement attachable to a power-operated draft linkage on the rear end of a tractor adapted to raise and lower such implement between transport and working positions, the combination comprising a frame, means for pivotally attaching said frame to the draft linkage to rock fore and aft thereon with raising and lowering of the same, a pair of earth engaging elements mounted on said frame for movement in successive increments between alternative positions relative to said frame and to each other, a change-over means connected to each said earth engaging element for simultaneous raising of one said element and lowering of the other in successive increments in response to actuating forces of opposite direction, an actuating means connected with the draft linkage and said change-over means for application to the latter of successive actuating forces in opposite directions respectively in unison with successive raising and lowering movements of the draft linkage, and means for selectively disengaging the connection between said actuating means and the draft linkage at any point in the operation of said change-over means.

27. In an implement, the combination of a frame having a positionally adjustable ratchet element connected thereto, a toggle linkage including first and second toggle links pivoted together end to end, means for alternately pushing and pulling on one of said links to switch said linkage through dead center position in opposite directions, a pawl carried by the other of said links and engageable with said ratchet element, and a member supported adjacent said ratchet element and engageable by said pawl in its operative movement for interrupting the engagement of said pawl with said ratchet element substantially coincident with each movement of the linkage past dead center, said pawl being shifted to and reengaged with said ratchet element at a different point incident to the continued movement of the linkage in the same direction, such shifting and reengaging of said pawl conditioning said linkage to impart successive increments of movement in the same direction to the ratchet element each time said linkage approaches dead center from either direction.

ERNEST V. BUNTING.

References Cited in the file of this patent

UNITED STATES PATENTS

| Number | Name | Date |
|---|---|---|
| 266,818 | Hazelrigg | Oct. 31, 1882 |
| 295,314 | Wall | Mar. 18, 1884 |
| 446,964 | Clark | Feb. 24, 1891 |
| 646,287 | Hundhausen | Mar. 27, 1900 |
| 696,786 | Zeliff | Apr. 1, 1902 |
| 1,383,251 | Waller | June 28, 1921 |
| 1,413,709 | Doffing | Apr. 25, 1922 |
| 1,582,734 | Constantinesco | Apr. 27, 1926 |
| 1,651,938 | Wolf | Dec. 6, 1927 |
| 2,249,861 | Silver | July 22, 1941 |
| 2,265,970 | Miller | Dec. 9, 1941 |
| 2,332,741 | Mott | Oct. 26, 1943 |
| 2,358,964 | Noffsinger | Sept. 26, 1944 |

FOREIGN PATENTS

| Number | Country | Date |
|---|---|---|
| 28,687 | France | Dec. 15, 1924 |
| | (Addition to 558,600) | |
| 217,271 | Great Britain | June 13, 1924 |
| 544,041 | Great Britain | Mar. 25, 1942 |